(12) United States Patent
Holly et al.

(10) Patent No.: US 12,241,402 B2
(45) Date of Patent: Mar. 4, 2025

(54) PRECHAMBER SPARK PLUG FOR AN INTERNAL COMBUSTION ENGINE AND INTERNAL COMBUSTION ENGINE

(71) Applicant: Mercedes-Benz Group AG, Stuttgart (DE)

(72) Inventors: Werner Holly, Merklingen (DE); Dietmar Bertsch, Aspach (DE); Arnold Kaden, Remshalden (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/546,894

(22) PCT Filed: Jan. 26, 2022

(86) PCT No.: PCT/EP2022/051675
§ 371 (c)(1),
(2) Date: Aug. 17, 2023

(87) PCT Pub. No.: WO2022/175032
PCT Pub. Date: Aug. 25, 2022

(65) Prior Publication Data
US 2024/0369011 A1 Nov. 7, 2024

(30) Foreign Application Priority Data
Feb. 18, 2021 (DE) .................. 10 2021 000 855.3

(51) Int. Cl.
*F02B 19/12* (2006.01)
*F02B 19/18* (2006.01)
(Continued)

(52) U.S. Cl.
CPC ............. *F02B 19/12* (2013.01); *F02B 19/18* (2013.01); *H01T 13/04* (2013.01); *H01T 13/54* (2013.01)

(58) Field of Classification Search
CPC .......... F02B 19/12; F02B 19/18; H01T 13/04; H01T 13/54
See application file for complete search history.

(56) References Cited

U.S. PATENT DOCUMENTS

| 4,291,662 A | 9/1981 | Nakamura et al. |
| 10,811,851 B1 | 10/2020 | Gozawa et al. |

(Continued)

FOREIGN PATENT DOCUMENTS

| DE | 207 953 A1 | 3/1984 |
| DE | 10 2004 039 818 A1 | 3/2006 |

(Continued)

OTHER PUBLICATIONS

Japanese-language Japanese Office Action issued in Japanese Application No. 2023-548965 dated Aug. 6, 2024 (5 pages).

(Continued)

*Primary Examiner* — Xiao En Mo
(74) *Attorney, Agent, or Firm* — Crowell & Moring LLP

(57) ABSTRACT

A prechamber spark plug for a combustion chamber of an internal combustion engine includes a prechamber, a first connecting conduit, and a second connecting conduit. The prechamber is fluidically connectable to the combustion chamber via the first and second connecting conduits such that a mixture of fuel and air is introducible out of the combustion chamber and into the prechamber. The first connecting conduit has, on an end opposite the prechamber and via which the mixture of fuel and air is introducible into the first connecting conduit, a first partial region extending in a peripheral direction of the first connecting conduit and having a bevel, and has a second partial region connected to the first partial region in the peripheral direction and extending in the peripheral direction of the first connecting conduit and in which the first connecting conduit is free of a bevel.

9 Claims, 2 Drawing Sheets

(51) Int. Cl.
*H01T 13/04* (2006.01)
*H01T 13/54* (2006.01)

(56) References Cited

U.S. PATENT DOCUMENTS

| | | |
|---|---|---|
| 2018/0230895 A1 | 8/2018 | Mori |
| 2021/0207523 A1* | 7/2021 | Guisasola ............... F02B 19/18 |
| 2021/0363913 A1* | 11/2021 | Schock ................. F02M 61/14 |
| 2023/0163574 A1 | 5/2023 | Sugiura |
| 2024/0110503 A1* | 4/2024 | Fimml ................ F02B 19/1014 |

FOREIGN PATENT DOCUMENTS

| | | |
|---|---|---|
| DE | 10 2018 211 009 A1 | 1/2020 |
| DE | 10 2018 007 093 A1 | 3/2020 |
| JP | 2018-131911 A | 8/2018 |
| JP | 2020-125644 A | 8/2020 |
| JP | 2022-21821 A | 2/2022 |
| WO | WO 2013/141681 A1 | 9/2013 |
| WO | WO 2020/048775 A1 | 3/2020 |
| WO | WO 2020/076222 A1 | 4/2020 |

OTHER PUBLICATIONS

PCT/EP2022/051675, International Search Report dated May 10, 2022 (Two (2) pages).
German-language Office Action issued in German application No. 10 2021 000 855.3 dated Oct. 15, 2021 (Seven (7) pages).
Anonymous, "Fase—Wikipedia", Nov. 14, 2021 pp. 1-2, XP055916058, URL: https://de.wikipedia.org/wiki/Fase.

* cited by examiner

PRECHAMBER SPARK PLUG FOR AN INTERNAL COMBUSTION ENGINE AND INTERNAL COMBUSTION ENGINE

BACKGROUND AND SUMMARY OF THE INVENTION

The invention relates to a prechamber spark plug for an internal combustion engine, in particular of a motor vehicle. The invention further relates to an internal combustion engine having at least one such prechamber spark plug.

A prechamber spark plug for a combustion chamber of an internal combustion engine should be taken as known from DE 10 2018 007 093 A1. The prechamber spark plug has a prechamber having several openings via which the prechamber can be fluidically connected to the combustion chamber. A mixture of fuel and air can thus be introduced from the combustion chamber into the prechamber via the openings. It is further provided that the openings are designed to cause a tumble flow of the mixture of fuel and air flowing into the prechamber via the openings.

WO 2013/141681 A1 additionally discloses a spark plug.

The object of the present invention is to create a prechamber spark plug and an internal combustion engine having such a prechamber spark plug, such that particularly stable combustions can be implemented in the prechamber spark plug.

A first aspect of the invention relates to a prechamber spark plug for a combustion chamber of an internal combustion engine, in particular of a motor vehicle. This means in particular that the motor vehicle formed for example as a motor car, in particular as a passenger car, has the internal combustion engine in its fully produced state and can be driven by means of the internal combustion engine formed for example as a reciprocating piston motor or reciprocating piston engine. For example, the internal combustion engine has an output shaft that can for example be formed as a crankshaft, in particular if the internal combustion engine is formed as a reciprocating piston motor or as a reciprocating piston engine. For example, the internal combustion engine has an engine housing, in particular formed as a cylinder housing, in particular as a cylinder crankcase, which is also referred to as an engine block and for example has, forms or delimits at least one cylinder. A piston of the internal combustion engine is for example moveably received in the cylinder, such that the piston and the cylinder respectively partially delimit the combustion chamber. For example, the piston is coupled in an articulated manner with the output shaft, in particular with the crankshaft, via a connecting rod, such that the translational movements of the piston in the cylinder can be transformed into a rotational movement of the output shaft. The output shaft can thus be rotated around a rotational axis relative to the module housing. The internal combustion engine can provide torques to drive the motor vehicle via the output shaft. In particular during a fired operation of the internal combustion engine, an in particular liquid fuel and air are introduced into the combustion chamber. The air, which is also referred to as fresh air, and the fuel form a mixture of fuel and air also simply referred to as a mixture or are components of the mixture which is at least temporarily received in the combustion chamber. The prechamber spark plug, which is also simply referred to as a spark plug, has a prechamber that is for example at least partially, in particular at least substantially and to more than half or completely delimited or formed by a housing of the prechamber spark plug, in particular directly. It is preferably provided that the housing is a housing formed separately from the engine housing and provided in addition to the latter, the housing being able to be held at least indirectly on the engine housing. The prechamber spark plug has several connecting conduits via which the prechambers can be or are fluidically connected to the combustion chamber. For example, the respective connecting conduit is formed in the housing of the prechamber spark plug, i.e., for example, delimited, in particular completely, by the housing of the prechamber spark plug, in particular directly. It is thus preferably provided that the prechamber spark plug is fluidically separated from the combustion chamber, in particular completely, up to a respective fluidic connection, implemented via the respective connecting conduit, between the prechamber and the combustion chamber. The mixture can be introduced out of the combustion chamber into the prechamber via the connecting conduits. If, for example, the specified piston moves from a bottom dead centre to a top dead centre, the mixture first received in the combustion chamber, i.e., at least a part of the mixture, is thus, for example, introduced, in particular pushed, from the combustion chamber via the connecting conduits, i.e., through the connecting conduits, into the prechamber. In the prechamber, the prechamber spark plug can provide or generate at least one ignition spark. By means of the ignition spark, the mixture that has flowed into the prechamber and is thus at least temporarily received in the prechamber is ignited and thus combusted. This results in so-called burning torches, which flow through the connecting conduits and thus penetrate into the combustion chamber via the connecting conduits and there ignite the mixture remaining in the combustion chamber, the mixture being consequently combusted.

So that particularly stable combustions can now be implemented in the prechamber, and thus in the prechamber spark plug, it is provided according to the invention that at least or exactly one of the connecting conduits has, on its end opposite the prechamber and thus in the combustion chamber and via which the mixture of fuel and air can be introduced or flows into the at least one connecting conduit, at least or exactly one first partial region extending in the peripheral direction of the at least one connecting conduit and having a bevel, in particular produced in a targeted manner and arranged on the end, and has at least or exactly one second partial region connected, in particular directly, to the first partial region in the peripheral direction of the at least one connecting conduit and extending in the peripheral direction of the at least one connecting conduit and in which the at least one connecting conduit or its end in the combustion chamber is free of a bevel produced in a targeted manner. In other words, the partial regions are a partial region of the end in the combustion chamber, and thus of the at least one connecting conduit, wherein the end in the combustion chamber or the at least one connecting conduit on its end in the combustion chamber has the bevel produced in a targeted manner in the first partial region, and wherein the end in the combustion chamber or the at least one connecting conduit on its end in the combustion chamber is free of a bevel produced in a targeted manner in the second partial region. It is in particular provided that the at least one connecting conduit, and thus the partial regions and in particular the bevel, end on an edge in the combustion chamber also described as an end edge, in particular in the longitudinal extension direction of the at least one connecting conduit when viewed towards the combustion chamber or, vice versa, in particular begin in the longitudinal extension direction of the at least one connecting conduit when viewed from the combustion chamber towards the prechamber, wherein for example the edge delimits an entry opening of the at least one connecting conduit uninterrupted in the peripheral direction of the at least one connecting conduit. The at least one connecting conduit leads into the combustion chamber via its entrance opening, such that the mixture flows into the at least one connecting conduit via the entrance opening, flows through the at least one connecting conduit starting from the entrance opening, flows out of the at least one connecting conduit and flows into the chamber, and thus flows or is guided into the prechamber via the at least one connecting conduit. The mixture can for example flow through the at least one connecting conduit along or in a flow direction pointing towards the combustion chamber, the direction for example coinciding with the longitudinal extension direction of the at least one connecting conduit or running in parallel to the longitudinal extension direction of the at least one connecting conduit. It is preferably provided that the previously specified peripheral direction of the at least one connecting conduit runs around the flow direction, i.e., around the longitudinal extension direction of the at least one connecting conduit. As the bevel is now arranged or produced in the first partial region, but not in the second partial region, and as the second partial region is free from a bevel produced in a targeted manner, the bevel does not extend completely around the entrance opening in the peripheral direction of the at least one connecting conduit, and instead the bevel extends only around a first part of the entrance opening in the peripheral direction of the at least one connecting conduit, wherein, in the peripheral direction of the at least one connecting conduit, the edge or the second partial region and thus not the bevel or another bevel produced in a targeted manner extends around a second part of the entrance opening connected, in particular directly, to the first part in particular in the peripheral direction of the at least one connecting conduit.

In other words, a wall of the housing of the prechamber spark plug, in particular formed as a solid body and delimiting the edge of the at least one connecting conduit, in particular in the peripheral direction of the at least one connecting conduit, in an uninterrupted manner has a first wall region extending in the peripheral direction of the at least one connecting conduit around the first part of the entrance opening and a second wall region extending in the peripheral direction of the at least one connecting conduit around the second part of the entrance opening, wherein the second wall region is preferably connected to the first wall region in the peripheral direction of the at least one connecting conduit, in particular directly. While the first wall region has the bevel, i.e., while the bevel is produced in a targeted manner in the first wall region, the second wall region is free of a bevel produced in a targeted manner.

The following knowledge is in particular the basis of the invention: prechamber spark plugs usually have a limited working range. Prechamber spark plugs either have a reduced low-load run limit (hidden occurrence of combustion misfires at low loads) or an increased tendency towards pre-ignition. A large adjusting lever, i.e., a good possibility for improving or widening the working range, and thus usage limits of a prechamber spark plug, is a flow configuration in the connecting conduits for example formed as holes. This should in particular be understood to mean that a flow through the respective connecting conduit or at least one of the connecting conduits can be influenced, in particular in a targeted manner, to improve the working range. The throughflow should be understood to mean the mixture flowing through the respective connecting conduit or a flow of the mixture flowing through the respective connecting conduit. As an alternative or in addition, the throughflow can be understood to mean that the respective connecting conduit is correspondingly formed to influence the flow of the mixture through the respective connecting conduit in an advantageous or targeted manner.

The flow of the mixture in the respective connecting conduit is usually caused by a surrounding flow. The surrounding flow is in particular a flow of the mixture in the combustion chamber, also referred to as a main combustion chamber, which can surround the prechamber at least partially, in particular at least substantially. The surrounding flow of the mixture in the combustion chamber can in particular be a tumble flow, i.e., be seen as an at least substantially tumble-like flow. In the case of conventional prechamber spark plugs, a one-sided or asymmetrical or non-axial or non-free inflow of the connecting conduits can thus result. This one-sided, asymmetrical, non-axial or non-free inflow can change, in particular negatively influence, the flow through the respective connecting conduit, and thus the flow and flushing of the or in the prechamber.

If the respective connecting conduit is completely free of a bevel on its end in the combustion chamber, and thus on its entrance opening also referred to as an entrance or hole entrance, the flow can separate significantly at the entrance, such that the respective connecting conduit only has a slight effective flow cross-section that is effectively, i.e., actually flowed through by the mixture. A poor flushing of the prechamber of residual gas can thus result. It is further conceivable to provide the respective connecting conduit with a bevel running around completely uninterrupted in the original of the respective connecting conduit on its end in the combustion chamber, in particular by means of milling, such that the bevel runs around in the peripheral direction of the respective connecting conduit. For this purpose, for example, milling to produce the completely surrounding bevel can be implemented axially to the respective connecting conduit or symmetrically to the respective connecting conduit, such that the bevel runs symmetrically around the periphery of the respective connecting conduit or its entrance opening, in particular uninterrupted. Low levels of separation can thus be advantageously realized in the respective connecting conduit, but a low degree of capture of a flow around the prechamber and only an insufficient flushing of the prechamber can also be the consequence.

The previously specified problems and disadvantages can be avoided via the invention. A particularly advantageous flow of the mixture in the at least one connecting conduit, and in particular through the at least one connecting conduit, can be achieved via the invention. In particular, a high and at least almost separation-free flow through the at least one connecting conduit with a high degree of capture of a flow around a prechamber can be represented. In comparison with conventional solutions, this enables an improved flushing of hot residual gas from the prechamber and thus an improved idling stability and a low tendency towards pre-ignition to be realized. The flushing of the prechamber or of the residual gas should in particular be understood to mean that, after the ignition and combustion of the mixture in the prechamber and in the combustion chamber, an exhaust gas resulting from this combustion of the mixture can be received in the prechamber, this exhaust gas being referred to as residual gas, and in the invention is particularly advantageously flushed, i.e., can be flushed out of the prechamber, in such a way that fresh mixture can particularly advantageously flow through the at least one connecting conduit and can thus flow out of the combustion chamber into the prechamber via the at least one connecting conduit.

It has proved particularly advantageous if the bevel or its lateral surface on the internal circumference is a segment of a notional (i.e., not actually present, but imagined to be present) truncated cone of which the central axis, with regard to which the notional truncated cone is formed rotationally symmetrically, runs in parallel to and at a distance from a longitudinal axis of the at least one connecting conduit, of which the geometrical centre of gravity and/or volume centre of gravity and/or area centre of gravity and/or midpoint lies on the longitudinal axis. The longitudinal axis of the at least one connecting conduit runs in parallel to the longitudinal extension direction of the at least one connecting conduit or coincides with the longitudinal extension direction. The area centre of gravity or midpoint should in particular be understood to mean that the at least one connecting conduit has a flow cross-section that can be flowed through by the mixture at least in a longitudinal region, the flow cross-section extending in a notional plane that runs perpendicular to the longitudinal extension direction, and thus perpendicular to the flow direction, wherein the area centre of gravity or the midpoint can be the area centre of gravity or the midpoint of the flow cross-section. The bevel is thus a so-called coaxial bevel, whereby particularly advantageous flow conditions can be created for the mixture in the at least one connecting conduit.

The coaxial bevel should in particular be understood as the following: The bevel is for example produced mechanically, i.e., via mechanical processing, in particular machining, in a method for producing the prechamber spark plug. For example, the bevel is produced by means of a conical or truncated cone-shaped milling cutter, and thus by milling processing, wherein the milling cutter can, for example, be an in particular tapered finger milling bit. To produce the bevel, the at least one connecting conduit on its end in the combustion engine, or the housing of the prechamber spark plug on the end of the at least one connecting conduit in the combustion chamber, is machined by means of the milling cutter in particular such that a longitudinal central axis of the milling cutter, which is formed rotationally symmetrically with regard to the longitudinal central axis, runs in parallel to the longitudinal axis and at the specified distance from the longitudinal axis of the at least one connecting conduit, which results in the longitudinal central axis of the milling cutter coinciding with the central axis of the notional truncated cone.

In order to realize particularly favorable flow conditions, it has here proved advantageous for a region if the distance is greater than 0 millimeters and no more than 5 millimeters, in particular no more than 3 millimeters. An excessive flow separation in the at least one connecting conduit can thus be avoided, and a high degree of capture of the flow around the prechamber can be implemented.

A further embodiment is characterized in that the end of the at least one connecting conduit in the combustion chamber has the bevel formed in the first partial region as the only bevel and is otherwise free of a bevel produced in a targeted manner. Particularly advantageous flow conditions can thus be obtained, such that a particularly large working range of the prechamber spark plug can be represented.

So that particularly advantageous flow conditions can be implemented in a particularly simple manner, in a further embodiment of the invention it is provided that the at least one connecting conduit is circular-shaped on its internal periphery. The so-called flow cross-section is thus preferably circular.

In a further, particularly advantageous embodiment of the invention, the at least one connecting conduit is formed as a hole, i.e., produced by drilling. Particularly advantageous flow conditions can thus be implemented in a particularly cost-effective manner. In particular if the at least one connecting conduit is formed as a hole, the longitudinal axis of the at least one connecting conduit is also referred to as a hole axis, with regard to which the at least one connecting conduit is for example formed rotationally symmetrically. The central axis of the notional truncated cone and the hole axis or the longitudinal axis of the at least one connecting conduit run in parallel with one another and have the previously specified distance from one another, whereby a particularly large or wide working range of the prechamber spark plug can be implemented.

It has proved particularly advantageous if at least one further one of the connecting conduits is free of a bevel, and therefore has sharp edges, on its further end opposite the prechamber in the combustion chamber and via which the mixture of fuel and air can be introduced into the at least one further connecting conduit. A particularly advantageous operation of the prechamber spark plug can thus be achieved, and thus of the internal combustion engine as a whole.

It is conceivable that the at least one further connecting conduit has a constant flow cross-section that can be flowed through by the mixture over its entire extension which runs from its further end in the combustion chamber to its second end facing the prechamber and opposite the further end in the combustion chamber. As an alternative or in addition, it is conceivable that the at least one connecting conduit and the at least one further connecting conduit are spaced apart from each other by at least 90°, in particular by at least 120°, in a peripheral direction of the prechamber running in particular around a central axis or a longitudinal extension direction. As an alternative or in addition, it is conceivable that the at least one connecting conduit has a constant flow cross-section that can be flowed through by the mixture over its entire remaining extension running from the bevel to the prechamber.

The bevel is preferably formed or produced by mechanical processing, in particular in a targeted manner, whereby the bevel can be produced particularly as required.

In the context of the present disclosure, the bevel, as is usually the case, should be understood as a bevelled surface on the end of the at least one connecting conduit in the combustion chamber, and in particular on the edge or border of the latter, wherein the edge or border is for example formed by the previously specified housing or by the wall regions.

It has further proved advantageous if the number of or all of the connecting conduits via which the prechamber is fluidically connected to the combustion chamber is no more than 15.

A second aspect of the invention relates to an internal combustion engine for a motor vehicle, wherein the internal combustion engine has at least one prechamber spark plug according to the first aspect of the invention. Advantages and advantageous embodiments of the first aspect of the invention should be seen as advantages and advantageous embodiments of the second aspect of the invention and vice versa.

A method for producing a prechamber spark plug, in particular according to the first aspect of the invention, for a combustion chamber of an internal combustion engine is also disclosed. In the method, a prechamber of the prechamber spark plug and several connecting conduits are produced, via which the prechamber can be fluidically connected to the combustion chamber and a mixture of fuel and air can thus be introduced from the combustion chamber into the prechamber.

So that a particularly stable combustion can now be implemented in the prechamber, and thus a particularly wide or large working range of the prechamber spark plug, it is provided that at least one of the connecting conduits is produced such that the at least one connecting conduit has, on its end opposite the prechamber in the combustion chamber and via which the mixture of fuel and air can be introduced into the at least one connecting conduit, at least or preferably exactly one first partial region extending in the peripheral direction of the at least one connecting conduit, having a bevel produced in a targeted manner and arranged on the end of the connecting conduit in the combustion chamber, and has at least or preferably exactly one second partial region connected, in particular directly, to the first partial region in the peripheral direction of the at least one connecting conduit and extending in the peripheral direction of the at least one connecting conduit and in which the at least one connecting conduit or an end thereof in the combustion chamber is free of a bevel produced in a targeted manner.

Further advantages, features and details of the invention result from the following description of a preferred exemplary embodiment and with reference to the drawings. The features and combinations of features specified previously in the description and the features and combinations of features specified in the following description of figures and/or shown in the figures alone can be used not only in the respectively specified combinations, but also in other combinations or in isolation without leaving the scope of the invention.

DETAILED DESCRIPTION OF THE DRAWINGS

Identical or functionally identical elements are provided with the same reference signs in the figures.

Figure 1:
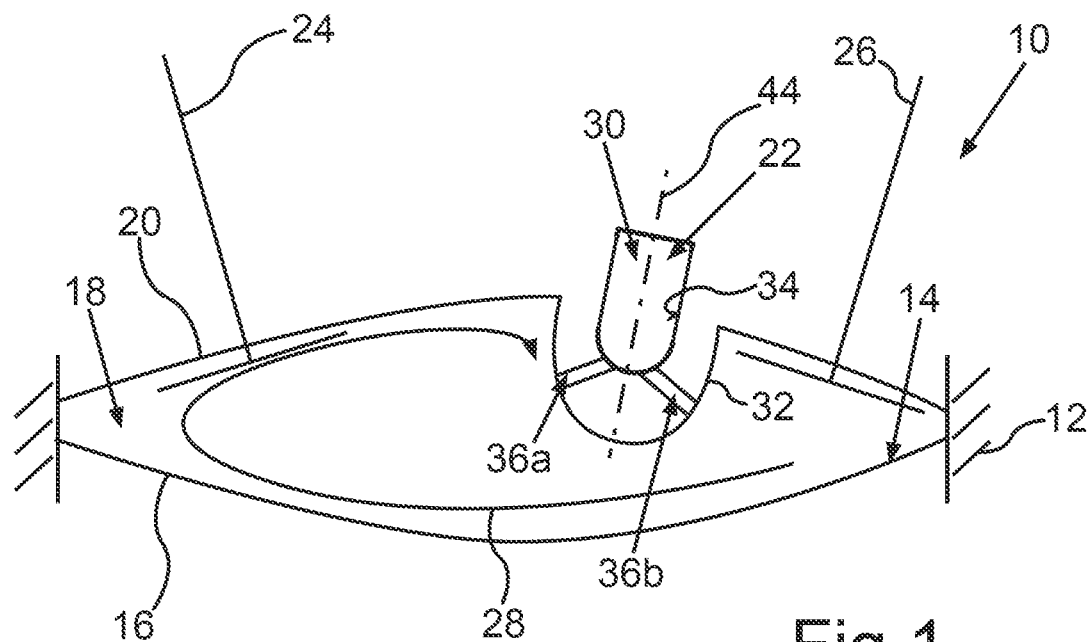
FIG. 1 shows a section of a schematic sectional view of an internal combustion engine according to the invention having a prechamber spark plug according to the invention.

FIG. 1 shows a section of a schematic sectional view of an internal combustion engine 2 of a motor vehicle, in particular of a motor vehicle preferably designed as a motor car. This means that the motor vehicle in its completely produced state has the internal combustion engine 10 and can be driven with this internal combustion engine 10. The internal combustion engine 10 preferably formed as a reciprocating piston motor or reciprocating piston engine has an engine block for example formed as a cylinder housing, in particular as a cylinder crankcase, a section of which can be seen in FIG. 1, only depicted very schematically and is described with 12. The engine block has at least one cylinder 14. This means in particular that the engine block 12 delimits or forms the cylinder 14, in particular directly. A piston 16 of the internal combustion engine 10 is received in the cylinder 14 such that it can be translationally moved. The internal combustion engine 10 has an output shaft in particular formed as a crankshaft, via which the internal combustion engine 10 can provide torques to drive the motor vehicle. The piston 16 is connected in an articulated manner to the output shaft via a connecting rod, such that the translational movements of the piston 16 in the cylinder 14 can be transformed into a rotational movement of the output shaft.

The cylinder 14 and the piston 16 respectively partially delimit a combustion chamber 18 of the internal combustion engine 10, of which the combustion chamber 18 is also delimited by a combustion chamber roof 20. The combustion chamber roof is formed for example by a further housing element, in particular formed as a cylinder head, of the internal combustion engine 10. The further housing element is preferably formed separately from the engine block 12 and connected to the engine block 12. The internal combustion engine 10 additionally has a prechamber spark plug 22 assigned to the combustion chamber 18, which is explained in more detail in the following.

At least one first gas exchange valve in the form of an inlet valve 24 is assigned to the combustion chamber 18, via which valve air, also referred to as fresh air, can be introduced into the combustion chamber 18. An in particular liquid fuel can additionally be introduced into the combustion chamber, in particular injected directly into the latter. The air and the fuel form a mixture of fuel and air, also simply referred to as a mixture, which is or can be at least temporarily received in the combustion chamber 18. The mixture in the combustion chamber 18, also referred to as a main combustion chamber, can be ignited by means of the prechamber spark plug 22 and can thus be combusted, resulting in exhaust gas from the internal combustion engine 10. At least one second gas exchange valve in the form of an outlet valve 26 is assigned to the combustion chamber 18, via which valve the exhaust gas can be removed from the combustion chamber 18.

A flow, also referred to as a surrounding flow, in particular of the mixture, into the combustion chamber is depicted by an arrow 28 in FIG. 1. With reference to the arrow 28, it can in particular be seen that the flow depicted by the arrow 28 is at least substantially a tumble flow, i.e., cylindrical, such that the flow depicted by the arrow 28 is also referred to as a tumble flow. It can be seen that the flow depicted by the arrow 28 runs cylindrically or in the manner of a roller around a roller axis not depicted in the figures, which runs perpendicular to an in particular notional plane that runs in parallel to a cylinder axis of the cylinder 14, which is, for example, formed at least substantially rotationally symmetrically with regard to the cylinder axis. The cylinder axis runs in particular in the longitudinal extension direction of the cylinder 14. The prechamber spark plug 22 has at least or exactly one prechamber 30 that is delimited, in particular directly, at least partially, in particular at least substantially and thus at least to more than half or completely, by a housing 32 of the prechamber spark plug 22. The prechamber 30 is in particular directly delimited, in particular directly, by a lateral surface 34 of the housing 32 on the internal periphery. The prechamber spark plug 22 has several, i.e., at least or exactly two connecting conduits 36a, b also referred to as nozzles and for example formed as through-openings, via which the prechamber 30 is or can be fluidically connected to the combustion chamber 18 also referred to as a main combustion chamber. The mixture of fuel and air (mixture), of which the flow into the combustion chamber 18 is depicted by the arrow 28, can thus flow out of the combustion chamber 18 via the connecting conduits 36a, b and thus be introduced into the prechamber 30. This means that the mixture can flow out of the combustion chamber 18 at least partially through the connecting conduits 36a, b and thus flow into the prechamber 30, such that at least a part of the mixture from the combustion chamber 18 can flow through the connecting conduits 36a, b and can thus flow into or be introduced into the prechamber 30.

Figure 2:
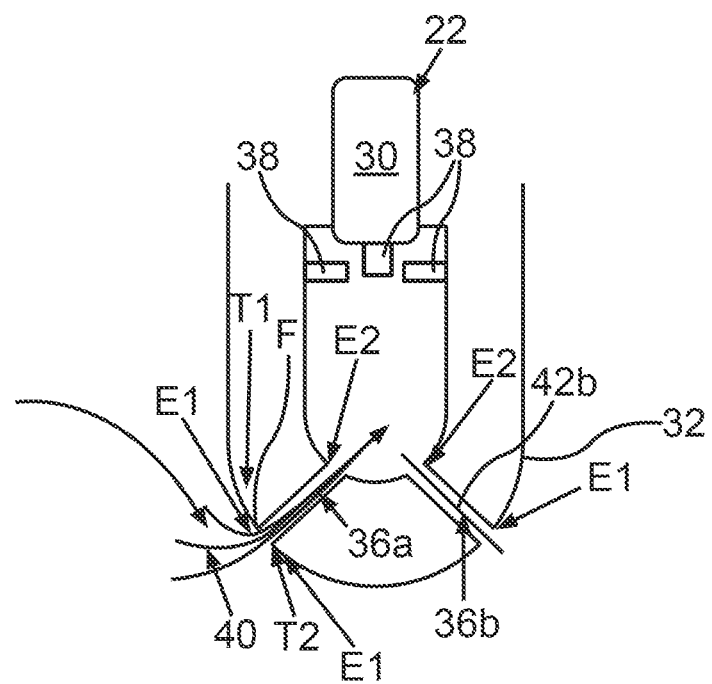
FIG. 2 shows a schematic and sectional side view of the prechamber spark plug.

It can be seen particularly clearly from FIG. 2 that the prechamber spark plug 22 has electrodes 38 that are, for example, arranged in an electrode region. By means of the electrodes 38, the prechamber spark plug 22 can generate and thus provide at least one ignition spark, in particular between electrodes 38, in the prechamber 30, wherein the prechamber spark plug 22 can generate or provide the ignition sparks in the electrode region and thus in the prechamber 30. By means of the ignition spark, the mixture in the prechamber 30, i.e., the part of the mixture that has flowed into the prechamber 30, is ignited and thus combusted. Burning torches result from the latter, which flow through the connecting conduits 36a, b and thus out of the prechamber 30 via the connecting conduits 36a, b and back into the combustion chamber 18. The mixture remaining in the combustion chamber 18, i.e., a further part of the mixture of fuel and air remaining in the combustion chamber 18, is thus ignited and consequently combusted, for example, from which the previously specified exhaust gas results.

Figure 3:
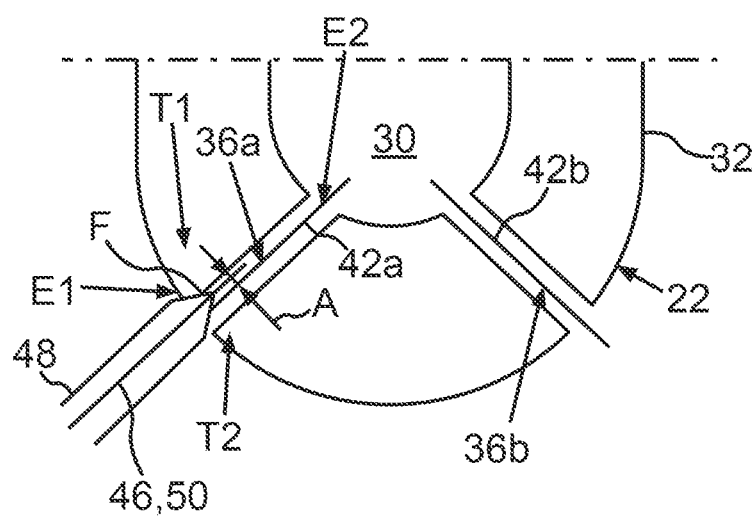
FIG. 3 shows a section of a further schematic and sectional side view of the prechamber spark plug.

In FIG. 2, a flow of the mixture out of the combustion chamber into and through the connecting conduit 36a is depicted by arrows 40, wherein the flow of the mixture through the connecting conduit 36a and into the connecting conduit 36a is also referred to as a throughflow. It can be particularly clearly seen from FIG. 2 that the respective connecting conduit 36a, b has a respective end E1 in the combustion chamber facing away from or opposite the combustion chamber of the prechamber 30 and a respective second end E2, which is also referred to as a further end, in the prechamber, facing the prechamber 30 and opposite or facing away from the respective first end E1. The respective connecting conduit 36a, b extends continuously and thus without interruption from the respective end E1 to the respective end E2, and thus ends on the respective end E1 or E2, and thus does not extend beyond the respective end E1 or E2. In FIGS. 2 and 3, a respective longitudinal axis of the respective connecting conduit 36a, b is designated 42a, b, of which the geometrical centre of gravity and/or volume centre of gravity and/or area centre of gravity and/or midpoint lies on the respective longitudinal axis 42a, b. It can be further be seen that the respective connecting conduit 36a, b has a respective longitudinal extension direction, and thus a respective longitudinal extension, wherein the respective longitudinal axis 42a, b runs in parallel to the respective longitudinal extension direction of the respective connecting conduit 36a, b or coincides with the respective longitudinal extension direction of the respective connecting conduit 36a, b, such that the longitudinal axes 42a, b depict the respective longitudinal extension directions. A respective through direction of the respective connecting conduit 36a, b additionally coincides with the respective longitudinal axis 42a, b. The respective through direction thus coincides with the respective longitudinal extension direction of the respective connecting conduit 36a, b. The respective connecting conduit 36a, b can be flowed through by the mixture, i.e., by the flow of the mixture, along its respective through direction. It can be seen that the respective through direction, and thus the respective longitudinal extension direction of the respective connecting conduit 36a, b, runs obliquely to a main axis 44 (FIG. 1) of the prechamber 30 also referred to or formed as a central axis or longitudinal central axis, which is for example formed at least substantially rotationally symmetrically with regard to the main axis 44.

In order to now be able to realize a particularly wide working range of the prechamber spark plug 22, and thus particularly stable combustions in the prechamber 30, it is provided—as can be seen particularly clearly from FIGS. 2 and 3—that the connecting conduit 36a, in particular exclusively the connecting conduit 36a with respect to the connecting conduits 36a, b, at its end E1 in the combustion chamber opposite the prechamber 30 and via which the mixture of fuel and air can be introduced from the combustion chamber 18 (main combustion chamber) into the connecting conduit 36a, has a first partial region T1 extending in the peripheral direction of the connecting conduit 36a running around the longitudinal axis 42a of the connecting conduit 36a and having a bevel F of the connecting conduit 36a produced in a targeted manner, and has a second partial region T2 directly connected to the first partial region T1 in the peripheral direction of the connecting conduit 36a and extending in the peripheral direction of the connecting conduit 36a, in which second partial region the connecting conduit 36a is free of a bevel produced in a targeted manner. In the exemplary embodiment shown in the figures, the bevel F or its lateral surface on the internal periphery, which for example directly delimits an entrance opening arranged on the end E1 of the connecting conduit 36a in a partially surrounding manner in the peripheral direction of the connecting conduit 36a, is a segment of a notional truncated cone, of which the central axis 46 (FIG. 3), with regard to which the notional truncated cone is formed rotationally symmetrically, runs in parallel to and at a distance A from the longitudinal axis 42a of the connecting conduit 36a, of which the geometric centre of gravity and/or volume centre of gravity and/or area centre of gravity and/or midpoint lies on the longitudinal axis 42a. It is provided that the distance A is greater than 0 millimeters and no more than 3 millimeters. It is additionally provided in the exemplary embodiment shown in the figures that the end E1 of the connecting conduit 36a has the bevel F formed in the first partial region T1 as the only bevel F and is otherwise free of a bevel produced in a targeted manner.

In the exemplary embodiment shown in the figures, the connecting conduits 36a, b are formed as holes and are circular on their internal periphery, with this applying to the connecting conduit 36a in particular with regard to its extension extending from an end of the bevel F facing the prechamber 30 through to the end E2 of the connecting conduit 36a in the combustion chamber. The connecting conduits 36a, b are additionally designed as holes. The connecting conduit 36b is completely free of a bevel both on its further end E1 in the combustion chamber opposite the prechamber 30 and on its end E2 in the prechamber facing the prechamber 30.

It can be particularly clearly seen from FIGS. 2 and 3 that the connecting conduit 36b has a constant and preferably round flow cross-section that can be flowed through by the mixture of fuel and air over its entire extension running from the end E1 of the connecting conduit 36b in the combustion chamber to the end E2 of the connecting conduit 36b in the prechamber facing the prechamber 30 and opposite the end E1 of the connecting conduit 36b.

In FIG. 3, a method for producing the prechamber spark plug 22 is depicted. It can in particular be seen from FIG. 3 that the connecting conduits 36a, b are formed or delimited, in particular directly, by the housing 32, in particular running around uninterrupted in the peripheral direction of the respective connecting conduit 36a, b. In other words, the connecting conduits 36a, b are in particular formed in the housing 32 over their entire peripheral direction. The bevel F is thus formed, i.e., produced, on a wall region of the housing 32. To produce the bevel F, a milling cutter 48 also referred to as a milling head is used, by means of which the bevel F is produced by machining. For example, the milling cutter 48 is a finger milling bit. It can be seen that the milling cutter 48 is a tapered milling cutter, in particular a tapered finger milling bit. This means that the milling cutter 48 is conical or truncated cone-shaped to produce the bevel F, in particular with regard to the partial regions T1 and T2 exclusively in the partial region T1. To implement the also as co-axial distance A, the milling cutter 48, while being rotated relative to the housing around its cone central axis coinciding 50 with the central axis 46, wherein the milling cutter 48 or its conical or truncated cone-shaped region used to produce the bevel F is formed rotationally symmetrically with regard to the cone central axis 50. The milling cutter 48 is brought into direct contact with the housing 32 to produce the bevel F such that the cone central axis 50 runs parallel to the longitudinal axis 42a and is spaced apart from the longitudinal axis 42a by the distance A. The bevel F is thus produced in a targeted manner on the end E1 of the connecting conduit 36a only in the partial region T1, and the end E1 otherwise remains free of a bevel produced in a targeted manner. An excessive flow separation in the connecting conduit 36a can thus be avoided on the one hand. On the other hand, a particularly high degree of capture of a flow around the prechamber can be implemented, such that residual gas first received in the prechamber 30 can be particularly advantageously flushed out of the prechamber 30.

The invention claimed is:

1. A prechamber spark plug (22) for a combustion chamber (18) of an internal combustion engine (10), comprising:
   a prechamber (30);
   a first connecting conduit (36a); and
   a second connecting conduit (36b);
   wherein the prechamber (30) is fluidically connectable to the combustion chamber (18) via the first connecting conduit (36a) and the second connecting conduit (36b) such that a mixture of fuel and air is introducible out of the combustion chamber (18) and into the prechamber (30);
   wherein the first connecting conduit (36a) has:
      on an end (E1) opposite the prechamber (30) and via which the mixture of fuel and air is introducible into the first connecting conduit (36a), a first partial region (T1) extending in a peripheral direction of the first connecting conduit (36a) and having a bevel (F) of the first connecting conduit (36a); and
      a second partial region (T2) connected to the first partial region (T1) in the peripheral direction of the first connecting conduit (36a) and extending in the peripheral direction of the first connecting conduit (36a) and in which the first connecting conduit (36a) is free of a bevel.

2. The prechamber spark plug (22) according to claim 1, wherein the bevel (F) is a segment of a notional truncated cone of which a central axis (46), wherein with regard to the central axis (46) the notional truncated cone is formed rotationally symmetrically, runs in parallel to and at a distance (A) from a longitudinal axis (42a) of the first connecting conduit (36a), of which a geometrical center of gravity and/or a volume center of gravity and/or an area center of gravity and/or a midpoint lies on the longitudinal axis (42a).

3. The prechamber spark plug (22) according to claim 2, wherein the distance (A) is greater than 0 millimeters and no more than 5 millimeters.

4. The prechamber spark plug (22) according to claim 1, wherein the end (E1) has the bevel (F) in the first partial region (T1) as the only bevel and is otherwise free of a bevel.

5. The prechamber spark plug (22) according to claim 1, wherein the first connecting conduit (36a) is circular-shaped on an internal periphery.

6. The prechamber spark plug (22) according to claim 1, wherein the first connecting conduit (36a) is formed as a hole.

7. The prechamber spark plug (22) according to claim 1, wherein the second connecting conduit (36b) is free of a bevel on a first end (E1) that is opposite the prechamber (30) and via which the mixture of fuel and air is introducible into the second connecting conduit (36b).

8. The prechamber spark plug (22) according to claim 7, wherein the second connecting conduit (36b) has a constant flow cross-section that is flowable through by the mixture of fuel and air over an entire extension which runs from the first end (E1) to a second end (E2) facing the prechamber (30) and opposite the first end (E1).

9. An internal combustion engine (10) for a motor vehicle, comprising:
   the prechamber spark plug (22) according to claim 1.

* * * * *